United States Patent Office 3,184,415
Patented May 18, 1965

3,184,415
CATALYST COMPOSITIONS CONSISTING OF GROUP IV METAL SALTS AND/OR OXIDES
Earl B. Huntley, Gibbstown, and Jurgen M. Kruse and John W. Way, Pitman, N.J., assignors to E. I. du Pont de Nemours and Company, Wilmington, Del., a corporation of Delaware
No Drawing. Original application Mar. 17, 1961, Ser. No. 96,350, now Patent No. 3,141,902, dated July 21, 1964. Divided and this application Aug. 20, 1963, Ser. No. 303,423
6 Claims. (Cl. 252—461)

This invention relates to a process for preparing acrylonitrile and to a catalyst for use in the process.

The synthesis of acrylonitrile by the vapor-phase reaction of propylene and nitric oxide over a silver-on-silica catalyst is described in U.S. Patent 2,736,739. As disclosed therein, this reaction gives acrylonitrile in conversions up to about 12%. While in some cases it is possible to obtain somewhat higher conversations by use of other known dehydrogenation catalysts, these conversions have not been within a range generally considered acceptable for industrial-scale operation.

We now have found that acrylonitrile can be obtained in good conversion by effecting the vapor-phase reaction of propylene and nitric oxide in the presence of a catalyst containing lead oxide and at least one oxide of the group titanium dioxide, zirconium dioxide, and stannic oxide, the lead oxide being chemically combined partially or totally with the other oxide(s) in the form of a salt.

Use of the above-described lead salt catalyst in the vapor-phase reaction of propylene and nitric oxide affords good conversions to acrylonitrile and at the same time results in the suppression of the formation of acetonitrile as a by-product. Furthermore, this catalyst is extremely stable to heat and as a result maintains its activity over prolonged periods of use. Still another advantage deriving from the use of this catalyst is the fact that the rate of carbon accumulation on the catalyst is low enough not to require regeneration at intervals which are considered too frequent for practical operation. Indeed, the deposition of carbon on the catalyst of the invention proceeds at a lower rate in the described reaction of propylene and nitric oxide than does such deposition on catalysts conventionally used in this reaction.

The proportion of lead salt(s) in the catalyst of the invention, and consequently the proportion of any uncombined oxides present, can vary within wide limits. When the lead oxide is totally combined with the other oxide(s) in the salt form, the catalyst may comprise (1) essentially all lead titanate, lead zirconate, and/or lead stannate, as would be obtained from the compelte chemical combination of stoichiometric quantities of lead oxide and the other oxide(s); or (2) the lead salt(s) plus a quantity of the other oxide(s), as can be obtained from the chemical combination of lead oxide and a stoichiometric excess of the other oxide(s). When the lead oxide is only partially combined with the other oxide(s) in the salt form, the catalyst may comprise (1) the lead salt(s) plus lead oxide, as can be obtained from the chemical combination of lead oxide, in stoichiometric excess, with the other oxide(s); or (2) the lead salt(s) plus lead oxide plus the other oxide(s), as can be obtained by the incomplete chemical combination of lead oxide with the other oxide component(s).

More specifically with respect to proportions, a catalyst consisting essentially all of lead salt(s), i.e., titanate, zirconate, and/or stannate, is a very effective catalyst, as shown in the example, for the vapor-phase reaction of propylene and nitric oxide to give acrylonitrile. The examples also show that a catalyst comprising only a very minor amount of lead salt(s) and the remainder essentially uncombined oxide(s) is also an effective catalyst for the vapor-phase reaction of propylene and nitric oxide. As is shown in the examples, a catalyst prepared from a mixture of only 1% by weight of lead oxide and 99% by weight of titanium dioxide and containing no uncombined lead oxide, i.e., a catalyst comprising only about 1.4% by weight of lead titanate and the remainder essentially titanium dioxide, is effective in the present process. As is also shown, a catalyst prepared from a mixture of only 0.4% by weight of titanium dioxide and 99.6% by weight of lead oxide and containing no uncombined titanium dioxide, i.e., a catalyst comprising only about 1.5% by weight of lead titanate and the remainder essentially lead oxide, also is effective. Thus, the proportion of lead salt(s) in the catalyst of the present invention can vary from about 1% up to 100% by weight.

The catalyst of the invention can be prepared by any of various catalyst preparation techniques, no one of which is critical to the invention. Preparation of the essential lead salt component is conveniently effected by heating a mixture of lead oxide with one or more of the aforesaid oxides at elevated temperatures, the specific temperature depending on the particular metal oxide used. For example, when lead titanate is to be prepared, temperatures of 400° C. or above are used. The necessary heating can take place, if desired, under conditions prevailing in the reactor, thereby forming the lead salt in situ, as is illustrated by Example 10. Also, other compounds of lead and of the appropriate metal convertible to the oxides can be used instead of the oxides in preparing the lead salt, if desired. Thus, any oxygen-containing lead compound which is converted to lead oxide (PbO) upon calcination can be used, e.g., the higher oxides of lead ($Pb_2O_3$, $Pb_3O_4$, and $PbO_2$), lead hydroxide, lead carbonate, lead nitrate, lead subacetate, and others. In addition to the oxides and hydrous oxides, other compounds of titanium, zirconium, and tin which can be used in the preparation of the catalyst are, for example, the chloride or nitrate, or the organic titanates. Titanium dioxide can be used in any of its three crystal forms, i.e., anatase, brookite, and rutile.

The catalyst can be unsupported or it can be supported on a substrate. For use in unsupported form the catalyst can be conveniently prepared by pelleting a mixture of lead oxide and the other oxide(s) either prior or subsequent to heating of the mixture at a temperature at which the lead salt(s) will form. Preferably, the oxides are intimately mixed prior to heating. If the salt is formed prior to the pelleting operation, the catalyst should be ground up to a suitable granule size prior to pelleting. In preparing the mixtures for pelleting, materials can be added thereto for such purposes as to facilitate agglomeration, provide the desired porosity, etc. For example, an aqueous solution of polyvinyl alcohol can be added to agglomerate the mixture. Porosity can be imparted to the pellets by incorporating in the mixture a material which will be burned out during the heating. Suitable materials are ammonium carbonate and polyethylene fibers.

If desired, the lead salt(s) can be extended on a support material, e.g., α-alumina. In making such a supported catalyst, the support can be impregnated with the desired catalyst materials by any one of various techniques. For example, the support material can be agitated together with titanium dioxide, zirconium dioxide, and/or stannic oxide in an aqueous solution of a water-soluble oxygen-containing salt of lead while the water is evaporated off; or the support material can be agitated in an aqueous solution of a water-soluble oxygen-containing salt of lead and a water-soluble compound of titanium, zirconium, and/or tin, while the water is evaporated off. A particularly effective method of impregnating the support material is that of evaporating alcoholic solutions of tetraalkoxy titanium, or other alcohol-soluble titanium compounds, and lead subacetate or lead acetate.

The present process is effected at temperatures generally within the range of 400° to 700° C. The particular operating temperature used will vary depending on such factors as the composition and surface area of the catalyst employed inasmuch as such factors have an effect on the temperature at which maximum conversion to acrylonitrile is achieved. For example, increasing the surface area of a catalyst appears to decrease the optimum operating temperature. The present process is operable at atmospheric pressure, although slight superpressures, e.g., up to about 5 atmospheres, are generally preferred from the point of view of ease of feed-stream processing.

The feed stream should be so composed as to provide between 0.1 and 3.0 moles of nitric oxide per mole of propylene, the lower ratio favoring high conversions based on nitric oxide and the higher ratio simplifying the separation of the product from unreacted starting material.

The feed rate and the catalyst bed volume should be such that the contact time is within the range of 0.1 to 10 seconds, preferably 0.8 to 3 seconds.

In addition to propylene and nitric oxide, the feed stream may contain inert gases such as the rare gases, e.g., argon, nitrogen, water vapor, and carbon dioxide. The nitric oxide used may be in the form of ammonia oxidation product gas consisting principally of nitrogen in addition to nitric oxide. The presence of saturated hydrocarbons, e.g., propane, is not deleterious in the present process.

The following examples serve to illustrate specific embodiments of the catalyst and process of the present invention. The term "conversion" used in the examples refers to the relationship, expressed in percent, between the moles of acrylonitrile obtained and the moles theoretically obtainable from the moles of nitric oxide fed to the reaction zone. "Yield" expresses the relationship between the moles of acrylonitrile obtained and the moles theoretically based on the nitric oxide consumed in the reaction (i.e., the moles fed to the reactor less the moles of unreacted nitric oxide recovered). Both the conversion and yield calculations were based on the following reaction stoichiometry:

$$H_2C=CH-CH_3 + 1.5 NO \rightarrow$$
$$H_2C=CH-C\equiv N + 0.25 N_2 + 1.5 H_2O$$

The surface area measurements were made by the method described in Analytical Chemistry 30, 1387–90 (1958) by F. M. Nelsen and F. T. Eggertsen. In this method the amount of nitrogen adsorbed by the sample is measured by concentration measurements in a continuous flow system.

Example 1

Powdered lead oxide and titanium dioxide (anatase) were mixed intimately in amounts such that the weight ratio of lead oxide to titanium dioxide in the mixture was 2.8 to 1, i.e., in the stoichiometric amounts required for the formation of lead titanate according to the equation:

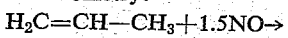
$$PbO + TiO_2 \rightarrow PbTiO_3$$

The mixture was heated at 1000° C., for 3 hours. After cooling, the fused mixture was ground to pass through a 200-mesh screen. The mixture then was pelleted into 3/16-inch pellets having a surface area of less than 1 sq. m./g. X-ray analysis of the pelleted catalyst revealed the presence of lead titanate and indicated no lead oxide or titanium dioxide.

The foregoing catalyst was packed into a tubular reactor operating at 520° C., and a gaseous mixture of 64% of nitrogen, 9% of nitric oxide, and 27% of propylene (all by volume) was passed at 15 p.s.i.g. pressure through the catalyst bed, the feed rate and the bed volume being such that the space velocity was 1250 reciprocal hours and the contact time was 2.0 seconds. The amount of acrylonitrile in the product stream was determined by vapor chromatography. A maximum conversion to acrylonitrile of 59% was realized.

Example 2

Powdered lead carbonate and titanium dioxide (anatase) were mixed intimately in amounts such that the weight ratio of lead carbonate to titanium dioxide in the mixture was 3.25 to 1, i.e., in the stoichiometric amounts required for the formation of lead titanate according to the equation:

$$PbCO_3 + TiO_2 \rightarrow PbTiO_3 + CO_2$$

The mixture was heated at 900° C. for three hours. After cooling, the fused mixture was ground to pass through a 200-mesh screen. The mixture then was pelleted into 3/16-inch pellets having a surface area of 0.44 sq. m./g. X-ray analysis of the pelleted catalyst revealed the presence of lead titanate and indicated no lead oxide or titanium dioxide.

When this catalyst was used in the reaction described in Example 1, a maximum conversion to acrylonitrile of 68% was realized at a temperature of 515° C. The yield was 100%.

Example 3

A series of catalysts was prepared from mixtures of lead oxide and titanium dioxide (anatase), either one or the other of the components being used in excess of the stoichiometric amount required for lead titanate formation. The preparation procedure was as follows:

The lead oxide and titanium dioxide were intimately mixed by milling in a ball mill for three hours, and the mixture was passed through a 20-mesh screen. Polyvinyl alcohol (in the amount of 0.2 ml. per gram of the mixture) and water were blended into the mixture in such a way that aggregates were formed nearly all of which passed through a 10-mesh screen and were held on a 20-mesh screen. The aggregate mixture then was dried at 100° C. for 45 minutes. The material was forced through a 20-mesh screen; and 4% by weight of ammonium carbonate was added as a porosity agent. The resulting material was pelleted into 3/16-inch pellets, which were heated in air at 425° C. for 75 hours. The pellets had a surface area of 6 sq. m. per gram, a pore volume of 0.15 cc. per gram, and a crushing strength of 15–25 p.s.i.

Shown in the following table are the conditions used and results obtained when these catalysts were used in the reaction described in Example 1. X-ray diffraction studies showed the presence of lead titanate in all of the catalysts; titanium dioxide in Catalysts 1, 2, and 3; and lead oxide in Catalysts 4 and 5.

| Catalyst No. | PbO/TiO2 wt. ratio in initial mixt. | Percent PbTiO2 in finished catalyst | Temp., °C. | ACRN [1] Percent conv. (max.) | ACRN [1] Percent yield | ACRN/ACN [2] (moles) |
|---|---|---|---|---|---|---|
| 1 | 1/1 | 68 | 490 | 65 | 70 | 4.1 |
| 2 | 0.053/1 | 6.8 | 510 | 58 | 75 | 11.0 |
| 3 | 0.01/1 | 1.4 | 530 | 55 | 55 | 8.0 |
| 4 | 5.7/1 | 56.8 | 506 | 58 | 60 | 5.0 |
| 5 | 249/1 | 1.5 | 471 | 52 | 52 | 4.0 |

[1] ACRN = acrylonitrile.   [2] ACN = acetonitrile (by-product).

Catalyst No. 1 gave a 63% conversion at 90% yield (ACRN/ACN mole ratio=8) in a 2-hour synthesis cycle after 150 hours of use. Occasional rises in temperatures up to 560° C. had no deterimental effect on the activity of the catalyst.

Example 4

A catalyst prepared according to the procedure described in Example 3 from lead oxide and titanium dioxide in a weight ratio of 1 to 1, pelleted into 5/32-inch pellets, and containing lead titanate, titanium dioxide, and lead oxide was used in the reaction described in Example 1 and gave acrylonitrile in a peak conversion of 73% at 500° C.; the average conversion over a period of 30 minutes was 71%.

Example 5

$\alpha$-Alumina (100 grams) was impregnated step-wise with (1) 20 milliliters of a 20% aqueous titanium chloride solution, (2) an aqueous solution containing 5.46 grams of lead nitrate, and (3) 5.5 milliliters of a 20% aqueous titanium chloride solution; and the material was dried at 500° C. for 4 hours and calcined at 800° C. for 10 hours. X-ray analysis of the calcined material showed the presence of lead titanate and indicated no lead oxide or titanium dioxide. When used in the process described in Example 1, this catalyst gave a maximum conversion to acrylonitrile of 67% at 526° C. The yield was ca. 100%. The acrylonitrile/acetonitrile mole ratio was 16/1.

Example 6

$\alpha$-Alumina (100 grams) was slurried in a methanol-isopropanol solution (8/1 methanol/isopropanol by volume) of 14.14 grams of lead subacetate and 16 milliliters of titanium tetraisopropoxide, i.e. in amounts such as to give, upon heating at 600° C., 15% lead titanate and 3% titanium dioxide. The mixture was heated at 600° C. for 10 hours. When used in the process described in Example 1, this catalyst gave an average converison to acrylonitrile of 72% at 505° C. for 2 hours. The maximum conversion at this temperature was 75%; the yield was 90%. The acrylonitrile/acetonitrile mole ratio was 8/1.

Example 7

An $\alpha$-alumina-supported lead titanate-lead oxide catalyst was prepared by impregnating the alumina with lead nitrate and titanium dioxide, and calcining at 675° C. This catalyst gave a maximum conversion to acrylonitrile of 60% (85% yield) at 520° C.

Example 8

An $\alpha$-alumina-supported lead zirconate catalyst was prepared by impregnating 80 grams of alumina with 11.47 grams of lead nitrate and 8.01 grams of zirconyl nitrate, and calcining at 600° C. This catalyst gave a maximum conversion to acrylonitrile of 57% at 505° C. The acrylonitrile/acetonitrile mole ratio was 8/1.

Example 9

Powdered lead carbonate (267.2 grams) and 150.7 grams of stannic oxide were mixed intimately, and the mixture was heated at 900° C. for five hours. After cooling, the fused mixture was ground to pass through a 200-mesh screen. The mixture then was pelleted into 3/16-inch pellets having a surface area of less than 1 sq. m./g. X-ray analysis of the pelleted catalyst revealed the presence of $Pb_2SnO_4$ and $SnO_2$.

The catalyst was used in the reaction described in Example 1 and gave a maximum conversion to acrylonitrile of 65% at a temperature of 485° C.

The lead salt in the catalyst need not be formed prior to the introduction of the catalyst into the reactor. Equally feasible in the formation of the salt in situ from a mixture of the starting materials under the conditions prevailing in the reactor. This embodiment is shown in the following example.

Example 10

Powered lead oxide and titanium dioxide (anatase) were mixed intimately in amounts such that the weight ratio of lead oxide to titanium dioxide in the mixture was 1 to 1, i.e., with the titanium dioxide in stoichiometric excess. The mixture was treated with a 15% aqueous solution of polyvinyl alcohol until 4% by weight of polyvinyl alcohol was added. The granules formed were dried in an oven at 100-120° C., then passed through sieves until the granules were 30–40 mesh size. Ammonium carbonate was added to the mixture in the amount of 10% by weight. The resulting material was pelleted into 3/16-inch pellets having a surface area of 5 sq. m. per gram and a crushing strength of 10–30 p.s.i. This catalyst was used in the reaction of propylene and nitric oxide as described in Example 1, the reactor operating at 472–531° C. and the pressure being 15 p.s.i.g. A maximum conversion to acrylonitrile of 77% was achieved at 510° C. The yield was 94%.

The favorable results obtained with the catalysts of the present invention are unexpected when one considers the behavior of the catalyst components singly in the present process. For example, when lead oxide alone was substituted for the catalysts of the invention in the reaction described in Example 1, a maximum conversion to acrylonitrile of only 36% was obtained at 535° C. (43% yield). In addition, a relatively large amount of by-product acetonitrile was produced.

Titanium dioxide is essentially inactive as a catalyst for the reaction of nitric oxide and propylene to form acrylonitrile. For example, when titanium dioxide was substituted for the catalysts of the invention in the reaction described in Example 1, a maximum conversion to acrylonitrile of only 5% was obtained at 510° C.

The foregoing detailed description has been given for clearness of understanding only and no unnecessary limitations are to be understood therefrom. The invention is not limited to the exact details shown and described for various modifications which do not materially change the basic character of the invention or depart from the principle or spirit of the invention will appear to those skilled in the art.

This application is a division of our co-pending application Serial No. 96,350, filed March 17, 1961, now Patent No. 3,141,902.

We claim:

1. A catalyst having as the essential catalytic constituent a mixture of at least about 1% by weight of at least one lead salt selected from the group consisting of lead titanate, lead stannate and lead zirconate, and, as the remainder of said mixture, at least one oxide selected from the group consisting of lead oxide, titanium dioxide, zirconium dioxide and stannic oxide.

2. A catalyst of claim 1 comprising a mixture of lead titanate and titanium dioxide.

3. A catalyst of claim 2 formed from a substantially equal weight mixture of lead oxide and titanium dioxide.

4. A catalyst of claim 1 comprising a mixture of lead titanate, titanium dioxide and lead oxide.

5. A catalyst of claim 1 comprising a mixture of lead stannate and stannic oxide.

6. A catalyst of claim 1 wherein said catalytic constituent is deposited on an $\alpha$-alumina support.

References Cited by the Examiner

UNITED STATES PATENTS

| | | | |
|---|---|---|---|
| 2,701,260 | 2/55 | Hagemeyer | 260—465.9 |
| 2,736,739 | 2/56 | England et al. | 260—465.3 |
| 3,009,943 | 11/61 | Hadley et al. | 260—465.3 X |

FOREIGN PATENTS 839,882   6/60   Germany.

MAURICE A. BRINDISI, *Primary Examiner.*